United States Patent [19]
Brelot et al.

[11] 3,778,157
[45] Dec. 11, 1973

[54] OPTICAL DISTANCE CONVERTER

[75] Inventors: Rene Brelot, Paris; Jean Tourret, Montrouge, both of France

[73] Assignee: Compagnie des Compteurs, Paris, France

[22] Filed: Nov. 4, 1971

[21] Appl. No.: 195,768

[30] Foreign Application Priority Data
Nov. 6, 1970 France .............................. 7040004

[52] U.S. Cl. ........................ 356/4, 356/1, 356/161, 250/227, 250/219 TH
[51] Int. Cl. ...................... G01c 3/08, G01b 11/00
[58] Field of Search .......................... 356/1, 4, 161; 250/227, 219 TH

[56] References Cited
UNITED STATES PATENTS
3,327,584    6/1967    Kissinger.................................. 356/4

Primary Examiner—Benjamin A. Borchelt
Assistant Examiner—S. C. Buczinski
Attorney—William R. Sherman et al.

[57] ABSTRACT

According to an illustrative embodiment an apparatus is provided for producing signals varying as a function of the distance of a surface relative to a reference face, comprising a fiber optic bundle for transmitting light to an emitting end thereof to illuminate a light reflecting surface. A fiber optic receiver bundle having at least one receiving end for picking up light reflected by the surface is provided for transmitting a flux of reflected light to produce a signal related to this relative distance by a linear relationship over a certain range of variation of such distance. The receiving end is transversely separated from the emitting end by an amount selected in accordance with a desired predetermined distance about which extends the above-mentioned range in which the signal to distance relationship is linear. For the purpose of measuring the thickness of transparent bodies as measured by the distance of an inner and an outer face thereof opposite the emitting end, the converter has at least two receiving ends arranged for providing respective signals linearly related respectively to the average distances of these inner and outer faces.

7 Claims, 15 Drawing Figures

PATENTED DEC 11 1973 3,778,157
SHEET 1 OF 4
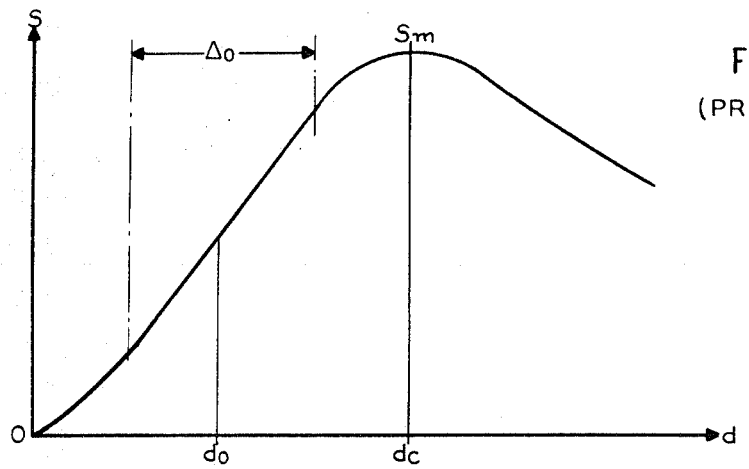
FIG. 1A
(PRIOR ART)
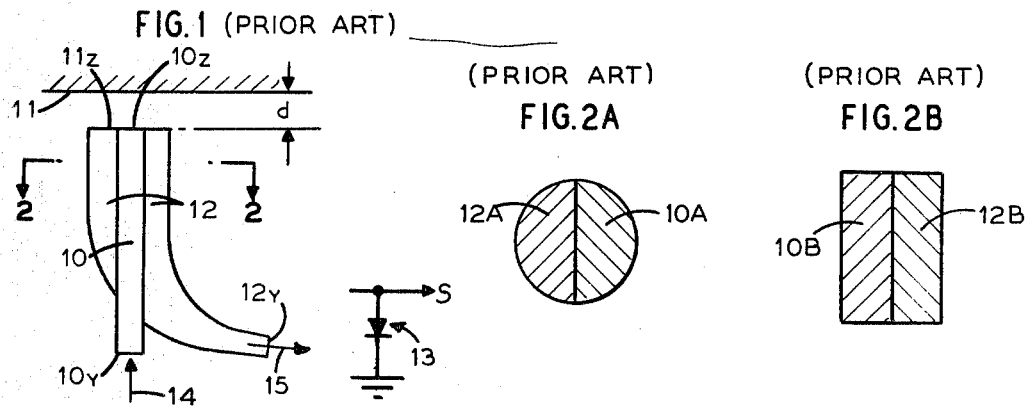
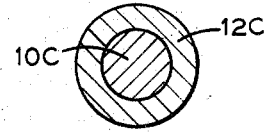
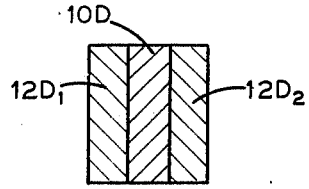
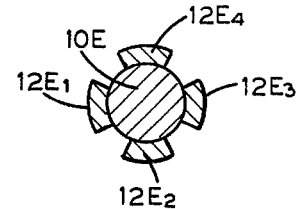

OPTICAL DISTANCE CONVERTER

The present invention relates to optical distance converting techniques and more particularly to apparatuses comprising optical guide means such as optical fibers, typically of glass or plastic, for converting into a light signal a distance between a surface and a reference face, or a variation thereof. Typically, such a light signal can in turn be converted into a corresponding electric signal for purposes such as direct reading, process control or further processing of the distance parameter converted.

Devices of this nature are already known, for example for measuring small displacements of objects subjected to vibrations. They typically comprise a central bundle of optical fibers which tansmits light from a source to a surface under test the distance or the displacement is to be sensed and measured. A luminous flux of light reflected by the surface is picked up by a second bundle of fibers which is juxtaposed to the first bundle and leads to a photoelectric detector which furnishes an output signal S. The characteristic response curve S (d) representing the variations of the signal S as a function of the distance d between the surface tested and a reference face on the converter has a linear zone over a distance range of width $\Delta_o$ in which the converter is particularly well-suited for use.

It is an object of the invention to extend the field of metrologic applications of this general type of converter and in particular to allow for its application to thickness measuring for transparent bodies.

According to the invention an apparatus is provided for producing signals varying as a function of the distance of a surface relative to a reference face, comprising optical guide means for transmitting light to an emitting end thereof to illuminate a light reflecting surface. Any face such as this emitting end, the position of which is well determined with respect to the converter, can be taken as a reference face for defining the distance of this surface. Optical guide receiver means having at least one receiving end for picking up light reflected by the surface are provided for transmitting a flux of reflected light to produce a signal related to this relative distance by a linear relationship over a certain range of variation of such distance. The receiving end is transversely separated from the emitting end by an amount selected in accordance with a desired predetermined distance about which extends the abovementioned range in which the signal to distance relationship is linear. Moreover, the transverse dimension of a receiving end and arrangement thereof along a radial line crossing the emitting end can be selected in accordance with the width of such distance range of linear variation, and provisions made to adjust the slope of this relationship to a desired value. Different receiving ends or sets of receiving and admitting ends may be used to increase the flexibility and reach different distance ranges while obtaining desired range width and sensitivity.

According to a further aspect of the invention several optical guide receiver means are used which are arranged with respect to the emitting end to obtain respective distance related signals varying according to linear relationships having substantially identical slope in respective different distance ranges. With photoelectric transducers to convert the luminous fluxes transmitted by said receiver means into signals, electrical ignals, this may advantageously be done by amplifying these electric signals with different appropriate gains. The receiver ends may be distributed with respect to one another to obtain respective linear relationships between the signals and the relative distance of a light reflecting surface over respective distance ranges succeeding each other to form a continuous range of linear operation.

According to another aspect of the invention the apparatus thereof can advantageously be applied to thickness measurements for transparent bodies, by having at least two receiving ends arranged for providing respective signals linearly related to respective distances of a first and second face of the transparent body opposite the emitting end. Further these signals can be subtracted to provide a direct representation of the thickness.

The invention will be better understood with reference to the following description and to the accompanying drawings. In the drawings:

FIG. 1 schematically shows a prior art optical converter;

FIG. 1A is a diagram of a characteristic response curve for the piror art device of FIG. 1;

FIGS. 2A to 2E show examples of possible cross-sections for the prior art converters;

Figure 3:
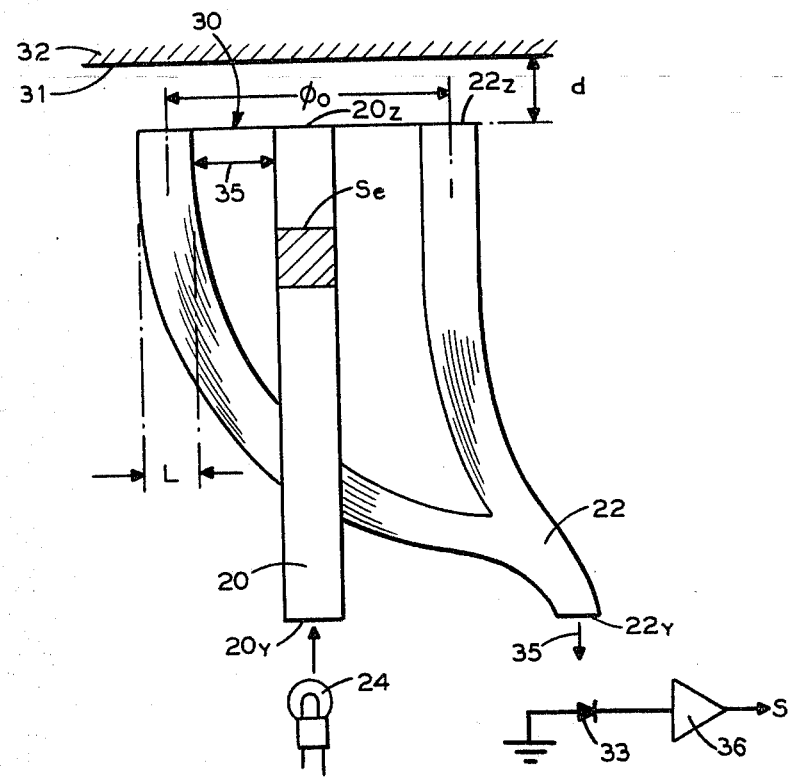
FIG. 3 shows a converter according to the invention.

To help in explaining the nature and the various aspects of the invention, a simple conventional converter is first described with reference to FIGS. 1, 1A and 2A to 2E. The converter of FIG. 1 has a bundle 10 of optical fibers oriented perpendicular to a surface 11 under test. Light from a light source denoted by an arrow 14 is admitted at its remote end 10y and emitted through its end 10z toward the surface 11 spaced by a distance d from this emitting end. The surface 11 has at least some light reflecting power and it is desired to detect the relative displacements of this surface by sensing the variations of its distance to the emitting end 10z. The first bundle 10 or transmitting bundle is associated with a second bundle 12 or receiver bundle which directs a flux of light reflected by the surface 11 towards a photoelectric detector 13, for example a phototransistor, a photo diode or a photo resistor, when this surface 11 is illuminated by the transmitting bundle 10. The detector 13 furnishes an electric signal S providing for the measurement of the variations in the distance d between the converter and the test surface 11.

The receiver bundle 12 of optical fibers has a light receiving end 12a juxtaposed to the emitting end 10z, which faces the surface 11 to pick up the light reflected thereby. The light flux transmitted by the bundle 12 emerges from a light output 12y as indicated by arrow 15 toward the detector 13. This receiving end may be comprised of several elementary ends of corresponding elementary bundles merging into a complex receiver bundle 12 for transmitting the reflected light flux to a common output 12y.

FIGS. 2A to 2E diagrammatically show cross-sections of the bundles 10 and 12 of a converter as shown on FIG. 1 along lines such as 2—2 in the vicinity of the emitting and receiving ends of these bundles. In FIGS. 2A and 2B respectively semicircular and rectangular transmitter and receiver bundles 10A, 10B and 12A, 12B are juxtaposed along a junction plane, whereas a tubular receiving bundle 12C surrounds a cylindrical transmitting bundle 10C in FIG. 2C. In FIG. 2D, a transmitting bundle 10D is sandwiched between two elementary receiver bundles $12D_1$ to $12D_2$ whereas in FIG. 2E four elementary receiver bundles $12E_1$ to $12E_4$ are distributed around the cylindrical transmitting bundle 10E.

The diagram of FIG. 1A shows the characteristic response curve $S(d)$ of the converter of FIG. 1. This curve comprises a linear zone in a distance range $\Delta_o$, centered about a mid-range distance value $d_o$, in which the converter is used. The geometry of the bundles of fibers, some examples of which have been discussed with reference to FIGS. 2A to 2E, and their dimensions determine this characteristic, in particular the extent of the zone $\Delta_o$, the maximum amplitude $Sm$ and the value $d_c$ of the corresponding distance. Under these conditions, the mean frontal distance of a converter, i.e., the value of the mid-range distance $d_o$ sometimes referred to later as its "frontal" for short, its sensitivity (slope of the linear zone), its measurement range $\Delta o$, and consequently its accuracy are not independent parameters. Moreover, it can be seen that the origin of the characteristic curve is situated at a distance $d = 0$ wherefrom the signal S increases practically as soon as the distance $d$ starts increasing.

FIG. 3 shows a converter having a sensing head 30 opposite a surface 31 whose distance $d$ relative to the sensing head 30 is to be converted into a representative signal. The converter has mounting means for the sensing head which are arranged for maintaining the sensing head in a known position which can be taken as a reference to define the distance $d$, these mounting means being of any suitable type. Depending on the particular use it is intended for, the converter may include a support for holding samples 32 with respect to the sensing head, the surface 31 of these samples facing the sensing head.

The converter of FIG. 3 has a transmitting bundle with respective admitting and emitting ends 20y and 20z, the admitting end being adjacent to a light source 24 and the emitting end 20z being flush in the sensing head 30 facing the surface 31. The converter also includes a receiver bundle 22 having an output end 22y adjacent to a photodiode 33 for converting light fluxes transmitted as shown by arrow 35 at this output end 22y into related electrical signals S. The receiver bundle has a receiving end 22z also part of the sensing head 30 in substantially coplanar relationship with the emitting end 20z, the surface 31 being placed parallel to the sensing head 30.

The cross-sectional shape of the terminal portion of this receiver bundle 22 is annular substantially as shown for the bundle 12C of FIG. 2C. Also, as in FIG. 2C, the transmitting bundle 20 is cylindrical. However, in this instance, the terminal portion of the receiver bundle 22 and its ring shaped receiving end 22z surround the terminal portion of bundle 20 and its respective circular emitting end 20z at a discrete spacing therefrom. In other words the receiving end 22z is not juxtaposed to the emitting end 20z and is actually transversely separated therefrom in the sensing head 30 by a discrete amount. This amount is defined here by the dimension of a gap separating opposite lateral bondaries of the terminal portions of the receiving and emitting bundles. In the converter of FIG. 3 this gap in the sensing head 30 is not made of any optically active medium such as any other light transmitting emitting or receiving end.

The particular shapes of the non-juxtaposed receiving and admitting ends could be different such as depicted in FIGS. 2A to 2E, for example. Also the ring-shaped receiving end of the presently described embodiment could be made of a circular series of elementary receiving ends equally spaced from said emitting end 20z, these elementary ends forming the terminal portions of respective elementary bundles which merge into a complex bundle 22.

Figure 3A:
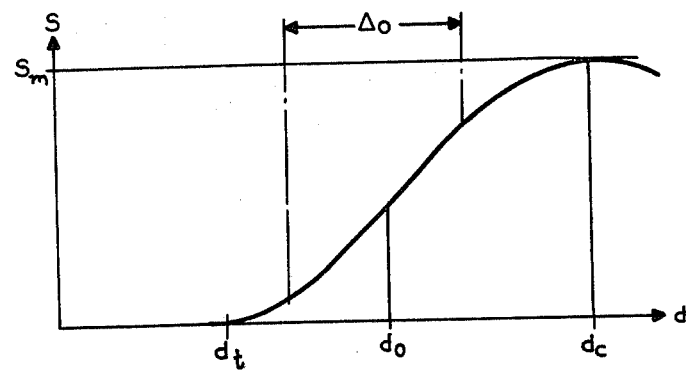
FIG. 3A shows the characteristic response curve of the converter of FIG. 3.

Referring again to FIG. 3, the mean diameter $\phi_o$ of the annular receiving ring 22z which characterizes the spacing between the emitting and receiving ends determines the frontal distance $d_o$ of the converter. The width L of the receiving ring determines the extent $\Delta$width of the distance range of linear operation (FIG. 3A). The maximum value $Sm$ of the signal S when $d = d_c$ is a function of the luminous flux transmitted, hence of the transverse cross-section $S_e$ of the transmitting bundle 20, and of the ratio of the transverse cross-section of the receiving bundle 22 to the total cross-section of the converter.

FIG. 3A shows that in this case the "origin" of the characteristic curve, or distance $d_t$ where a signal noticeable for practical purpose can be detected may be quite different from zero.

It can then be understood that by adjusting the three parameters $\phi_o$, L and $S_e$ defined above, it is possible to obtain a series of converters having an adjustable frontal distance $d_o$, all with the same measurement range $\Delta o$, and the same sensitivity (which is a function of $\Delta o$ and $Sm$). For this purpose, the knowledge of $\Delta o$ permits L to be obtained. The choice of the value $d_o$ determines the diameter $\phi_o$ to use. In order to compensate for the loss of sensitivity with respect to the converter shown in FIG. 1 in which $d_o \sim \Delta o/2$, loss which occurs when the receiving end is transversely spaced apart from the emitting end, the cross-section $S_e$ is increased for compensation. As an alternative the value of the sensitivity can also be adjusted by acting on the gain of a preamplifier 36 connected at the output of the photoelectric detector 33.

Also, more than one receiver bundle can be used with the same transmitting bundle. Moreover, in the latter case, a gap separating the receiving end of one receiver bundle from the emitting end includes a gap between this receiving end and another receiving end closer to the emitting end. Two receiver bundles 22 having such separated receiving ends can provide signals varying linearly about predetermined spaced apart distances, which may be the average distances of the same surface when in two different spaced apart positions relative to the sensing head, or the average respective distances of two different spaced apart surfaces both opposite to the sensing head such as the front and rear faces of a transparent body for example.

These receiver bundles may then have their respective output ends associated with two respective detectors.

According to a further aspect of the invention a series of juxtaposed receiving bundles associated with one emitting bundle of fibers is used to increase the operating range of the converter without modifying its sensitivity or its precision.

Figure 4:
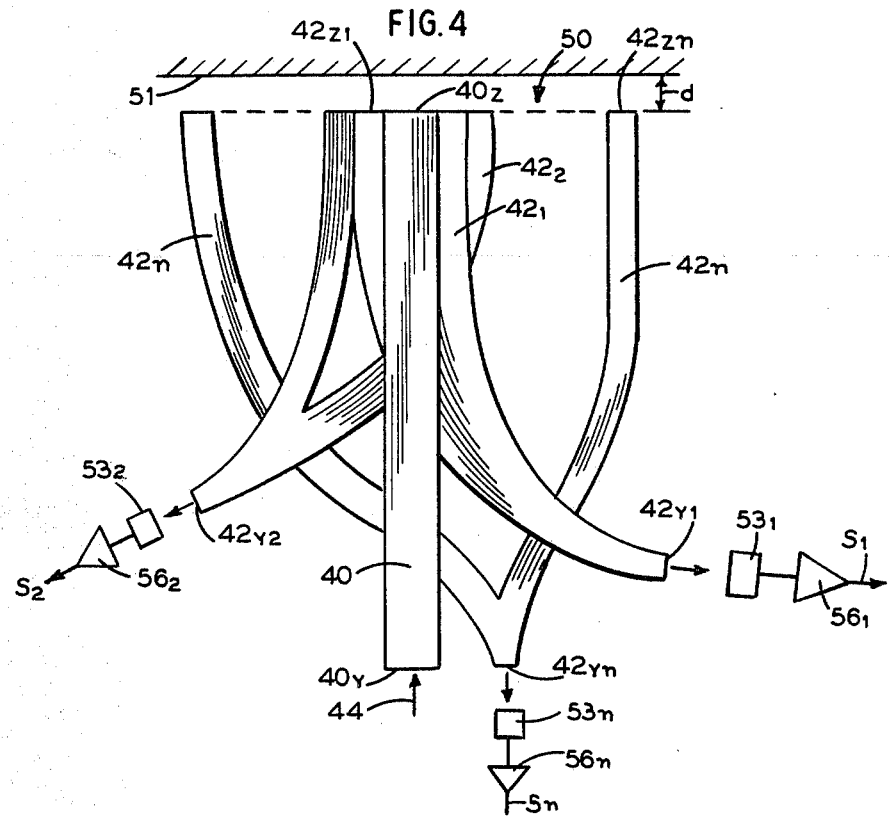
FIG. 4 shows another converter according to the invention with the corresponding characteristics.

Such an embodiment is illustrated by FIG. 4, in which a central transmitting bundle 40 is associated with several receiving bundles $42_1$, $42_2$, ...$42_n$ having each the same configuration and the same radial width L. The respective emitting end $40z$ and the receiving ends $42_{z1}$, ... $42_{zn}$ are comprised in the same sensing head 50 at a distance d from a surface 51 under test. The respective output ends $42_{y1}$, $42_{y2}$, $42_{yn}$, are disposed adjacent to light flux transducers $53_1$, $53_2$, ...$53_n$ coupled to preamplifiers $56_1$, $56_2$, ... $56_n$ which deliver respective distance related signals $S_1$, $S_2$. ...$S_n$. The gains of the various preamplifiers $56_1$, $56_2$, ... $56_n$ are adjusted such that the slopes p1, p2...pn of the linear zones of the characteristics $S_1$, $S_2$, ...$S_n$ are equal. In this example, the receiver bundle $42_1$ has its receiving end $42_{z1}$ juxtaposed to the emitting end $40_z$ and all the receiving ends $42_{z1}$, $42_{z2}$, ...$42_{zn}$ are juxtaposed to one another although if desired there can be one or more transverse gaps between some of these ends in the sensing head 50. The arrangement depicted by FIG. 4 is such that the characteristic curve for $S_1$, ...$S_n$ (FIG. 4A) have their maximum for values $d_c$, $2d_c$, ... $nd_c$, so that the signal $S_k$ of the Kth receiving bundle 42K is used in its linear region of operation when the distance from the test surface to the converter lies between $(K-1) d_c$ and $Kd_c$ (FIG. 4A).

Figure 4A:
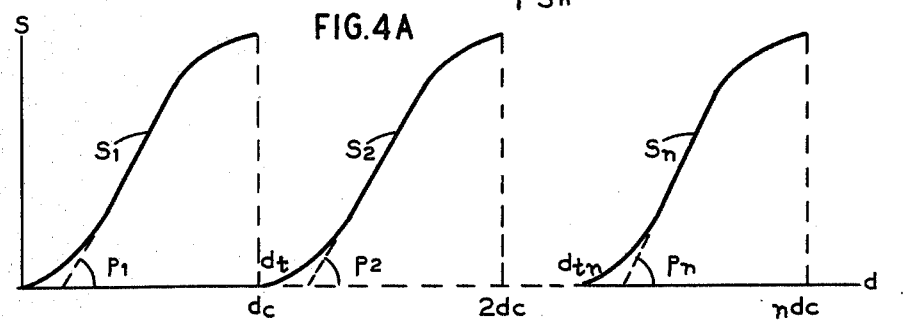
FIG. 4A shows the characteristic of the apparatus of FIG. 4.

With reference to FIG. 4A it can be seen that in the arrangement of FIG. 4 the origin of the Kth characteristic curve substantially occurs for the distance $d_{c\ K-1}$ of the maximum of the preceding characteristic.

Figure 4B:
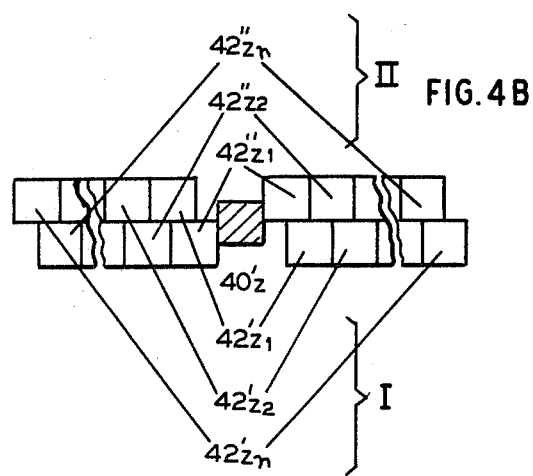
FIG. 4B is a schematic front view of a sensing head of a converter derived from the converter of FIG. 4.

Since the converter incorporating this feature is usable only in the linear parts of the characteristics $S_1$, $S_2$, ... there still remain some "blind" zones between the linear zones. FIG. 4B shows a front view of the sensing head of a converter to obviate this disadvantage by providing two series I, II of receiving ends identical to the series shown in FIG. 4, the series I ($42'_{z1}$ to $42'_{zn}$) being radially offset with respect to series II ($42''_{z1}$ to $42''_{zn}$). Each receiving end $42'_z$ and $42''_z$ is associated to a transducer coupled to a preamplifier via a corresponding receiving bundle. In this manner, the spacings between the respective receiving ends and the emitting ends are such that the linear parts of the signal characteristic curves of one of the series coincide with the non linear or "blind" zones of the other series, and the converter is thus usable over a continuous distance range of operation, without interruption and with the same sensitivity and the same precision, this continuous range being made up of the successive individual ranges of linear variation of the signals issued from each receiver bundle.

In this case the individual receiving ends overlap when their position is referred to a single radial reference line, i.e., when their spacings from the emitting end are referenced to a common axis. Note that this can still be true and the same result be obtained if the receiving ends of each bundle or elementary bundle are not as clearly individualized as shown in the preceding examples, some fibers stemming out of two or more distinct receiving bundles having their ends interlaced in the sensing head for example. The same remark applies to other embodiments where fiber ends of some receiving ends may be partially intermingled while still embodying the principles of the invention. Also the shapes of these receiving ends are not limited to those shown in these figures nor are their sizes necessarily equal.

Figure 5:
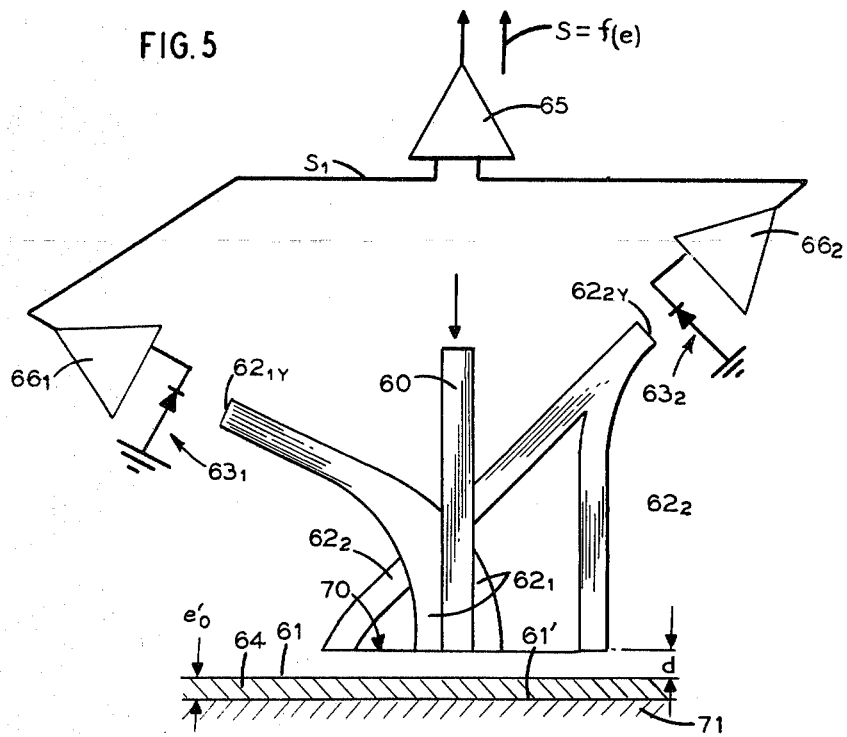
FIG. 5 shows a converter adapted for the measurement of the thickness of transparent bodies.

FIG. 5 shows a schematic diagram of a converter adapted for the measurement of the thickness of a transparent body 64 of average thickness $e_o'$ in accordance with the invention. This transparent body such as a sheet or slide of glass or plastic lies on a support 71 opposite the sensing head 70 and normally fixed relative thereto. The converter comprises a central transmitting bundle 60 and two annular receiving bundles $62_1$ and $62_2$ having as previously described respective emitting and receiving ends in the sensing head 70 and a respective light admitting end and light output ends $62_{1y}$ and $62_{2y}$. The receiving bundles $62_1$ and $62_2$ have their receiving ends arranged with respect to the emitting end to direct the luminous fluxes respectively reflected by the front face 61 and the rear face 61' of the body 64 towards the photoelectric detectors $63_1$ and $63_2$. The outputs of these detectors are respectively connected, via two preamplifiers $66_1$, $66_2$ to the inputs of a differential amplifier 65 which furnishes an output signal representative of the difference between the distance related signals $S_1$ and $S_2$, i.e., relates to the measured thickness $e$.

Due to the refraction the sensing head 70 "sees" the rear face 61' through the front transparent face 61 at an average distance $d_o + e_o$, where $e_o \approx ne'_o$ and $d_o$ is the average distance $d \cdot e_o$ is normally larger than $e'_o$ if the refraction index $n$ of the transparent material of the body 64 is greater than the index of air. $e_o$ is thus the average thickness of a slice of air equivalent from the point of view of the sensing head 70 to the average thickness $e'$ of the body.

Figure 5B:
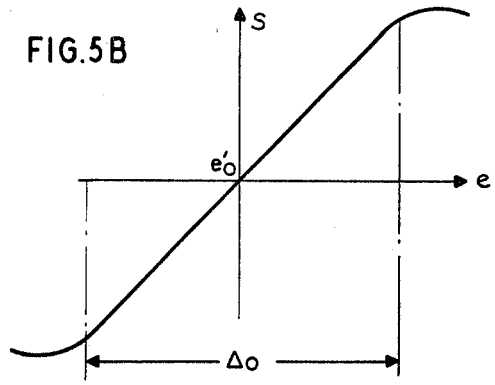
FIGS. 5A and 5B show characteristic curves in connection with the apparatus of FIG. 5.
Figure 5A:
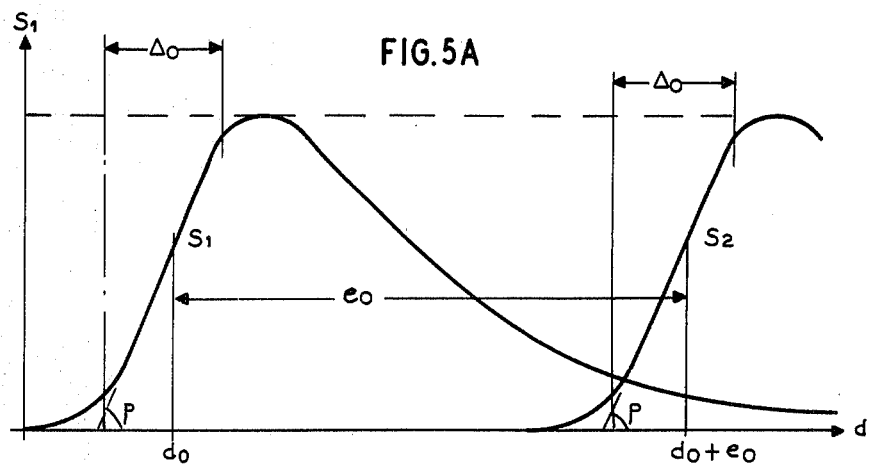

The parameters L and $\phi_o$ of the converters are adjusted so that the characteristics $S_1$ and $S_2$ (FIG. 5A) corresponding to the two receiving channels respectively including receiving bundles $62_1$ and $62_2$ are such that the centers of their linear zones (or mid-range distance of linear variation) — which have the same slope $p$ by proper adjustment of the gain of amplifiers $66_1$ and $66_2$ for example — are spaced apart by the distance $e_o$ equal to the average thickness of the slice of air equivalent to the average thickness $e'_o$ of the body 14 to be measured. The range width $\Delta_o$ is so selected as to cover, on the one hand, the variations in the real thickness $e$ about the value $e'_o$, and on the other hand, the possible variations in the distance $d$ from the converter to the face 61 of the body 64. This distance $d$ being on the average equal to $d_o$ and the sensitivities of the two receiving channels being equal, the characteristic curve of the output signal $S$ varying as a function of the thickness $e$ can be obtained from FIG. 5A and indicated in FIG. 5B. It can be seen that this characteristic has a linear region of variation of amplitude $\Delta_o$ about the mean value $e_o'$. This form of characteristic is easy to use either for directly measuring the body thickness, or for commanding servo control devices arranged to maintain constant the thickness of a manufactured product.

In this application, the value of the signal $S_1$ for distances within a range of width $\Delta_o$ about distance $d_o + e_o$, i.e., in the linear zone of the characteristic $S_2$ must be small enough and sufficiently linear not to cause any distortion of the differential signal $S$. In other words, the mean thickness to be measured $e'_0$ must be large enough with respect to the sum of the possible thickness variations and the possible variations in the distance $d$ from the converter to the front face 61 of the body to be measured. Nevertheless, in the case of the servo control of the thickness, this limitation is much less severe.

The invention is naturally not limited to the embodiments which have been described by way of example, and many modifications can be made without departing from its scope as defined by the appended claims.

What is claimed is:

1. Apparatus for measuring the thickness of a transparent body comprising:

optical guide means for transmitting light from a terminal portion thereof for reflection by a front face and a rear face of a transparent body having said front face opposite said terminal portion and at a frontal distance therefrom, the thickness of the body being represented by the distance between these faces;

first and second optical guide receiver means each having a receiving and an output end for transmitting a corresponding flux of the light reflected by the transparent body from such receiving end to such output end, the receiving ends of said first and second receiver means being disposed with respect to said terminal portion to obtain first and second relationships between the corresponding light fluxes and the distance from said terminal portion to a corresponding one of the front and rear faces of the transparent body which are substantially linear over a frontal distance range and a body thickness range;

means for converting the light fluxes corresponding to said first and second receiving means into respective first and second signals varying linearly with the distance from said terminal portion to said front and rear faces respectively with substantially the same rate of variation within the frontal distance range and the body thickness range; and means coupled to said signal converting means for producing a third signal functionally related to the difference between the magnitudes of said first and second signals which is representative of body thickness over the frontal distance range and the thickness range.

2. The apparatus of claim 1 wherein said signal converting means includes respective detector means responsive to the corresponding light fluxes for producing representative electrical signals and means for selectively amplifying each said representative electrical signal to produce said first and second signals having the same rate of linear variation.

3. Apparatus for measuring the thickness of a transparent body having front and rear faces, comprising:

means including a light transmitting guide for transmitting light from an emitting end portion thereof for reflection by the front and rear faces of the transparent body, the emitting end portion positioned opposite the front face at a frontal distance therefrom, the thickness of the body being represented by the distance between said faces, first means for converting a first flux of the light reflected by the front face of the body into a first electrical signal and second means for converting a second flux of the light reflected by the rear face of the body into a second electrical signal, said first converting means including a first light receiving guide having a first receiving end disposed with respect to said emitting end portion for picking up at least said first light flux and first photodetecting means responsive to said first light flux for producing said first electrical signal, and said second converting means including a second light receiving guide having a second receiving end disposed with respect to said emitting end portion for picking up at least said second light flux and second photodetecting means responsive to said second light flux for producing said second electrical signal, said first and second receiving ends defining respective first and second elementary probe heads with said emitting end portion, the relationships between the magnitudes of said first and second electrical signals and the distance from the emitting end portion to the respective one of said front and rear light reflecting faces being represented by first and second characteristic curves respectively, each said curve having distance as one coordinate thereof and electrical signal magnitudes as the other coordinate thereof and being characterized by, a non-linear section having an origin at the distance coordinate for a substantially null value of said electrical signal magnitude, the position of the origin of the respective curve with respect to the origin of said distance coordinate being determined by the position of the respective one of said first and second receiving ends relative to said emitting end portion, a peak section having a maximum valve essentially determined by the cross-sectional area of said emitting end portion, the ratio of the cross-sectional area of the respective one of said first and second receiving ends to the cross-sectional area of the corresponding one of said first and second elementary probe heads, and the gain of the respective one of said first and second photodetecting means, said curves being further characterized by a substantially linear section joining said non-linear section and said peak section over a working range along the distance coordinate and having a range width determined by the transverse dimension of the respective one of said first and second receiving ends, a mid-range point at a distance along said distance coordinate which is determined by the relative positions of said emitting end portion and the respective one of said first and second receiving ends, and a slope determined by the maximum amplitude of said peak section, the linear section of said first curve extending over a frontal distance range between said emitting end portion and the front face of the transparent body, and the linear section of said second curve extending over a rear distance range defined by this frontal distance range and a range of thickness variations of said transparent body, and the slopes of the linear sections of said first and second curves being substantially equal, whereby said first electrical signal varies linearly with distance between said emitting end portion and the front face at the same rate than the rate of linear variation of said second electrical signal with distance between said emitting end portion and the rear face of the body, over said frontal distance and thickness ranges; and means coupled to said first and second detecting means for combining said first and second electrical signals to produce a third signal functionally related to the difference in magnitude between said first and second electrical signals which is representative of thickness of the transparent body.

4. The apparatus of claim 3 wherein said combining means includes a differential amplifier having first and second inputs responsive to said first and second electrical signals respectively.

5. Apparatus for measuring thickness within a range of a transparent body having front and rear faces, comprising:

light transmitting means including a fiber optics bundle for transmitting light from an emitting end portion thereof for reflection by the front and rear faces of the transparent body, the emitting end portion positioned opposite the front face within a frontal distance range therefrom, the thickness of the body being represented by the distance between said front and rear faces;

a first light receiving fiber optics bundle having a first output and first receiving end located at a first transverse spacing from said emitting end portion for picking up a first flux of the light reflected by the front face of the transparent body;

first photodetecting means at said first output responsive to said first light flux for producing a first electrical signal;

a second light receiving fiber optics bundle having a second output and a second receiving end located at a second transverse spacing from said emitting end portion, said second spacing being greater than said first spacing, for picking up a second flux of the light reflected by the rear face of the transparent body;

second photodetecting means at said second output responsive to said second light flux for producing a second electrical signal;

said first and second receiving ends defining respective first and second elementary probe heads with said emitting end portion, and the relationships between the magnitudes of said first and second electrical signals and the distance from the emitting end portion to the respective one of said front and rear light reflecting faces being represented by first and second characteristic curves respectively, each said curve having distance as one coordinate thereof and the respective electrical signal magnitude as the other coordinate thereof, and being characterized by, a non-linear section having an origin at the distance coordinate for a substantially null value of said electrical signal magnitude, the position of the origin of the respective curve with respect to the origin of said distance coordinate being determined by the respective one of said first and second spacings, a peak section having a maximum value essentially determined by, the cross-sectional area of said emitting end portion, the ratio of the cross-sectional area of the respective one of said first and second receiving ends to the cross-sectional area of the corresponding one of said first and second elementary probe heads, and the gain of the respective one of said first and second photodetecting means, said curves being further characterized by a substantially linear section joining said non-linear section and said peak section over a range along the distance coordinate and having a range width determined by the transverse dimension of the respective one of said first and second receiving ends, a mid-range point at a distance along said distance coordinate which is determined by the respective one of said first and second spacings, and a slope determined by the maximum amplitude of said peak section, said first receiving end having a transverse dimension defining a working range width for said first curve substantially equal to the width of the frontal distance range, the gains of said first and second photodetecting means being adjusted to different values selected to establish a substantially equal slopes for the linear sections of said first and second curves, and the difference between said second and first spacings determining a displacement between the mid-working range points of said first and second curves equal to the mid-range value of the thickness range; and differential amplifier means having first and second outputs responsive to said first and second electrical signals respectively for producing a signal representative of the thickness of a transparent body within the ranges of thickness and of frontal distances between said emitting end portion and the front face of the transparent body.

6. Apparatus for producing at least one signal varying linearly as a function of the distance in the normal direction from a reference face of the apparatus of a light reflecting surface, comprising:

light transmitting means including a light transmitting guide having an emitting end portion at the reference face for transmitting light to a surface so as to be reflected by the surface;

means for converting first and second fluxes of the light reflected by the surface into respective first and second output signals whose respective magnitudes vary differently in relation to the distance between the emitting end portion and the light reflecting surface, said converting means including first and second light receiving guides having first and second receiving ends located with respect to said emitting end portion at first and second transverse spacings therefrom for picking up said first and second light fluxes respectively, said first and second receiving ends having respective first and second transverse dimensions and defining respective first and second elementary probe heads with said emitting end, the relationships between the magnitude of said first and second output signals and the distance from the emitting end portion to the light reflecting surface being represented by first and second characteristic curves respectively, each said curve having distance as one coordinate thereof and being characterized by, a non-linear section having an origin at the distance coordinate for a substantially null value of said output signal magnitude, said first and second transverse spacings determining the position of the origin of the respective curve with respect to the origin of said distance coordinate, a peak section having a maximum value essentially determined by the cross-sectional area of said emitting end portion, the ratio of the cross-sectional area of the respective one of said first and second receiving ends to the cross-sectional area of the corresponding one of said first and second elementary probe heads, and gain of said converting means with respect to the corresponding one of said first and second output signals, said curves being further characterized by a substantially linear section joining said non-linear section and said peak section over a working range along the distance coordinate and having a range width determined by the transverse dimension of the respective one of said first and second receiving ends, a mid-range point at a distance along said distance coordinate which is determined by the transverse spacing between said emitting end portion and the respective one of said first and second receiving ends, and a slope determined by the maximum amplitude of said peak section, the gains of said converting means with respect to said first and second output signals being adjusted to define linear curve sections of equal slopes and peak sections of substantially equal maximum amplitudes for said first and second characteristic curves, whereby said curves have substantially identical shapes, said second transverse spacing being greater than said first transverse spacing but smaller than the sum of said first transverse spacing and said first transverse dimension, whereby said substantially identical curves are displaced with respect to one another along the distance coordinate, with the origin of said second curve falling between the origin of said first curve and the distance coordinate of the maximum peak value thereof, and the relative values of said spacings and transverse dimensions being further selected so that the working ranges of said first and second ranges have at least one point in common along the distance coordinate whereby the apparatus has an extended linear working range.

7. The apparatus of claim 6 comprising a third receiving light guide having a third receiving end having substantially the same transverse dimension as said first receiving end and juxtaposed thereto opposite to said emitting end.

* * * * *

UNITED STATES PATENT OFFICE
CERTIFICATE OF CORRECTION

Patent No. 3,778,157                    Dated   December 11, 1973

Inventor(s)   Brelot et al

It is certified that error appears in the above-identified patent and that said Letters Patent are hereby corrected as shown below:

IN THE SPECIFICATION:

Column 1, line 68, delete "means into signals, electrical ig-" and insert -- means into respective electrical sig- --.

Column 2, line 62, delete "12a" and insert -- 11z --.

Column 4, line 27, delete " $\Delta$width", and insert -- $\Delta_o$ -- .

IN THE CLAIMS:

Column 10, line 37, change "apparatus of a light" to read -- apparatus to a light -- .

Signed and sealed this 23rd day of July 1974.

(SEAL)
Attest:

McCOY M. GIBSON, JR.              C. MARSHALL DANN
Attesting Officer                 Commissioner of Patents